United States Patent [19]

Lasis

[11] 4,242,478
[45] Dec. 30, 1980

[54] LOW BENZENE BUTADIENE POLYMERIZATION

[75] Inventor: Evalds Lasis, Sarnia, Canada

[73] Assignee: Polysar Limited, Sarnia, Canada

[21] Appl. No.: 29,545

[22] Filed: Apr. 12, 1979

[30] Foreign Application Priority Data

May 8, 1978 [CA] Canada .................................. 302852

[51] Int. Cl.³ ............................ C08F 4/60; C08F 2/06
[52] U.S. Cl. .................................. 526/93; 526/340.4; 526/903
[58] Field of Search ......................................... 526/93

[56] References Cited

U.S. PATENT DOCUMENTS

| | | | |
|---|---|---|---|
| 3,068,180 | 12/1962 | van Amerongen | 252/429 |
| 3,845,029 | 10/1974 | Throckmorton | 526/93 |
| 3,962,375 | 6/1976 | Throckmorton | 526/335 |
| 3,966,697 | 6/1976 | Kampf | 526/93 |

FOREIGN PATENT DOCUMENTS

707408  4/1965  Canada .................................. 526/169.1

*Primary Examiner*—C. A. Henderson
*Attorney, Agent, or Firm*—Stevens, Davis, Miller & Mosher

[57] ABSTRACT

A process is provided for the polymerization of butadiene-1,3 to yield a high cis-1,4-polybutadiene in which the diluent for the polymerization is a mixture of cyclohexane and either or both of benzene and butene-1, wherein the amount of benzene is markedly reduced in comparison with that generally used. The polybutadiene may be used in the manufacture of tires and in impact polystyrene.

4 Claims, No Drawings

LOW BENZENE BUTADIENE POLYMERIZATION

BACKGROUND OF THE INVENTION

The present invention is directed to a process for the polymerization of butadiene-1,3 in which the amount of benzene used as polymerization diluent is significantly reduced.

The art is replete with examples of catalyst systems for the polymerization of butadiene-1,3. Free radical emulsion polymerization systems have been long known but the product has not been acceptable for use in the manufacture of tires for a variety of reasons. The development of the solution polymerization processes is well known. One such system uses an alkyl lithium, generally butyl lithium, polymerization initiator. Two distinct systems using Ziegler catalysts have been developed and adopted commercially. One Ziegler system uses titanium compounds in combination with aluminum alkyl compounds and the other system utilizes cobalt compounds in combination with aluminum alkyl compounds. Early disclosures connected with the use of the Ziegler catalysts taught that almost any hydrocarbon solvent could be used as the polymerization diluent although the only materials actually exemplified were benzene, toluene and benzene-butene mixtures. Commercial development of the systems was based on the use as diluent of benzene alone or mixed with butene, especially butene-1, because of the high polymerization rates achievable and the relative ease of removal of the diluents from the polymer.

Much more recently, concern has been raised as to the desirability of having even very low levels of benzene vapor in the working atmosphere. Because of the mechanical, technical and cost problems associated with the elimination of low levels of benzene from both the work environment and the polymer, it is desirable to reduce or eliminate benzene from the diluent system.

SUMMARY OF THE INVENTION

I have now discovered a process wherein butadiene-1,3 can be polymerized, with the aid of a cobalt compound-aluminum alkyl compound catalyst, in a diluent containing much reduced or zero levels of benzene. By the use of my process, levels of benzene in the work environment are markedly reduced and the level of residual benzene in the polymer is extremely low or eliminated.

DETAILED DESCRIPTION

The present invention, in one aspect, is directed to a process for the polymerization of butadiene-1,3 to produce a cis-1,4 polybutadiene having a cis-1,4 content of at least about 90% using a catalyst system comprising a cobalt salt of an organic carboxylic acid, an aluminum alkyl halide and water, characterized in that the polymerization is in the presence of (i) a diluent which comprises, per 100 parts by weight, from 100 to about 80 parts by weight of cyclohexane and from 0 to about 20 parts by weight of benzene or butene-1, and (ii) a modifier selected from about 0.05 to about 0.15 parts by weight of butadiene-1,2 per 100 parts by weight of butadiene-1,3 or from about 0.2 to about 0.7 parts by weight of 1,5-cyclo-octadiene per 100 parts by weight of butadiene-1,3.

In another aspect, the invention is directed to a process for the polymerization of butadiene-1,3 to produce a cis-1,4 polybutadiene having a cis-1,4 content of at least about 90% using a catalyst system comprising a cobalt salt of an organic carboxylic acid, an aluminum alkyl halide and water, characterized in that the polymerization is in the presence of (i) a diluent which comprises, per 100 parts by weight, from about 92.5 to about 60 parts by weight of cyclohexane, from about 2.5 to about 15 parts by weight of benzene and from about 5 to about 25 parts by weight of butene-1, and (ii) a modifier selected from about 0.05 to about 0.15 parts by weight of butadiene-1,2 per 100 parts by weight of butadiene-1,3 or from about 0.2 to about 1 part by weight of 1,5-cyclo-octadiene per 100 parts by weight of butadiene-1,3.

The catalyst system used in my process comprises a cobalt salt of an organic carboxylic acid, suitable organic acids including the fatty acids such as hexanoic acid, 2-ethyl hexanoic acid, palmitic acid, stearic acid, dodecanoic acid, octadecanoic acid and octanoic acid, and the aromatic acids such as benzoic acid, phthalic acid and naphthenic acid. Preferred cobalt salts are cobalt (II) octanoate and cobalt (II) naphthenate. The catalyst system also comprises an aluminum alkyl halide including aluminum dialkyl chlorides and aluminum dialkyl bromides wherein the alkyl groups may be methyl, ethyl, propyl, butyl or hexyl. The preferred compound is diethyl aluminum chloride. The final component of the catalyst system is water. The proportions of the components of the catalyst system may be varied but generally, the molar ratio of the cobalt salt to the aluminum alkyl halide is in the range 1:5 to 1:500 and most generally from 1:50 to 1:250. The amount of cobalt salt used is from about 0.01 to about 0.5, preferably from about 0.02 to about 0.2 millimoles of cobalt salt per 100 g of butadiene-1,3. The amount of water used is from about 0.2 to about 0.9 millimoles per millimole of aluminum alkyl compound.

The amount of diluent used in the polymerization is from about 20 to about 1, preferably from about 8 to about 3 parts by weight per 1 part by weight of butadiene-1,3. The diluent is preferably essentially anhydrous so that the water present in the polymerization mixture is preferably essentially only that intentionally added.

The composition of the diluent is important. In one aspect of the invention, the diluent comprises, per 100 parts by weight, from 100 to about 80 parts by weight of cyclohexane and from 0 to about 20 parts by weight of either benzene or butene-1. A preferred range for the composition of the diluent is from about 92.5 to about 85 parts by weight of cyclohexane and from about 7.5 to about 15 parts by weight of benzene.

In another aspect of the invention, the diluent comprises, per 100 parts by weight, from about 92.5 to about 60 parts by weight of cyclohexane, from about 2.5 to about 15 parts by weight of benzene and from about 5 to about 25 parts by weight of butene-1. A preferred composition for the diluent is from about 80 to about 60 parts by weight of cyclohexane, from about 5 to about 15 parts by weight of benzene and from about 15 to about 25 parts by weight of butene-1, and most preferably from about 70 to about 60 parts by weight of cyclohexane, from about 10 to about 15 parts by weight of benzene and from about 20 to about 25 parts by weight of butene-1.

The conversion of butadiene-1,3 to polymer is generally less than about 75 percent, preferably is within the range of about 55 to about 70 percent. The polybutadiene is a rubbery polymer having a molecular weight of about 30 to about 70 Mooney (ML 1+4 at 100° C.).

The composition of the diluent used in the present invention is to be compared with that usually used in the commercial facilities for the production of cis-1,4-polybutadiene using Ziegler-type catalysts. The prior art diluents are pure benzene or toluene, usually benzene, or mixtures of benzene and butene-1 in which the benzene forms from about 60 to about 80 weight percent of the diluent. Comparison with the diluents of the present invention clearly shows the marked reduction in the amount of benzene used in the diluent which, in turn, leads to a marked reduction in the amount of benzene in the work environment and remaining in the product.

It was most unexpected to find that the polymerization process of the present invention would lead to the production of a satisfactory yield of polybutadiene and a satisfactory quality of the polybutadiene. The prior art clearly shows that an aromatic compound, especially benzene, must form a major component of the diluent in order to achieve a satisfactory rate of polymerization and in order to produce a linear polymer—in the absence of benzene, the polymerization is very slow and the polymer is highly branched.

Another component of the polymerization system is the modifier. The modifier appears to modify the polymerization in such a way that the rate of polymerization is increased and the quality of the product is maintained especially with regard to maintaining low levels of branching. The modifier is selected from butadiene-1,2 and 1,5-cyclooctadiene. When butadiene-1,2 is used as the modifier, it is present in the amount of from about 0.05 to about 0.15 parts by weight of butadiene-1,2 per 100 parts by weight of butadiene-1,3, preferably from about 0.1 to about 0.15 parts by weight. When 1,5-cyclooctadiene is used as the modifier, the amount is from about 0.2 to about 1, preferably from about 0.3 to about 0.8 parts by weight of 1,5-cyclooctadiene per 100 parts by weight of butadiene-1,3. The preferred modifier is 1,5-cyclo-octadiene.

The polybutadiene produced by the process of this invention may be used where polybutadiene is known to be useful including the manufacture of tires wherein polybutadiene is usually mixed with other tire rubbers and as the rubber in impact polystyrene.

In the following examples, the polymerizations were in bottles which had been dried to remove water and cooled under nitrogen to ensure the absence of oxygen. All materials used were dried by conventional methods to remove water, and oxygen was excluded by handling all materials under nitrogen. When the bottles had been charged with all components except the cobalt and the aluminum alkyl compounds, they were put into a constant temperature bath and after temperature equilibration, cobalt compound followed by the aluminum alkyl compound was added, following which the bottles were agitated for the desired time. In order to terminate polymerization, 5 ml of acetone containing about 2 weight percent of 2,6-ditertiary butyl-4-methyl phenol were injected through the cap of the bottle. The polymer was recovered by venting volatile materials from the bottle following which the contents of the bottle were dumped into 1 liter of methanol containing 1 weight percent of 2,6-ditertiary butyl-4-methyl phenol, thoroughly washed and rewashed with fresh methanol and then dried in a vacuum oven. In a commercial scale operation, the polymer would be recovered by the well known methods including contact of the cement with hot water to remove volatile materials followed by drying of the water-wet polymer. Mooney measurements were done using the ASTM procedure. The DSV is the solution viscosity of the polymer determined at a concentration of 0.3 g per 100 ml toluene. The microstructure was determined by infra-red analysis.

EXAMPLE 1

Butadiene-1,3 was polymerized in a solvent mixture of cyclohexane and benzene, using butadiene-1,2 as a polymerization modifier and a cobalt octoate-aluminum diethyl chloride (DEAC)—water catalyst. The polymerization temperature was 27° C. and the time was 2 hours, the other details are shown in Table I. Infra-red analysis showed the polymers of experiments Nos. 2, 4 and 5 to have about 97% of the unsaturation present in the cis-1,4 configuration and about 1.6% present in the 1,2 configuration.

TABLE I

| Experiment No. | 1 | 2 | 3 | 4 | 5 |
|---|---|---|---|---|---|
| Cyclohexane g | | | 312 | | |
| Benzene g | | | 35 | | |
| Butadiene-1,3 g | | | 84.3 | | |
| Butadiene-1,2 g | | | 0.12 | | |
| Cobalt octoate g | | | 0.0097 | | |
| DEAC millimoles | | | 4.7 | | |
| Water millimoles | 0.83 | 0.97 | 1.03 | 1.21 | 1.38 |
| Conversion to polymer % | 58.2 | 54.7 | 69.2 | 69.3 | 76.0 |
| Mooney (ML 1 + 4 at 100° C.) | 12.5 | 33.5 | 43.5 | 45.5 | 54.5 |
| DSV | — | 1.83 | 1.93 | 1.97 | 2.14 |

EXAMPLE 2

Butadiene-1,3 was polymerized in a mixture of cyclohexane and benzene as the solvent, the composition of the mixture being varied. The polymerization conditions, the polymer yield and the polymer characteristics are shown in Table II (pphm means parts per 100 monomer, by weight).

TABLE II

| Experiment No. | 1 | 2 | 3 | 4 | 5 | 6 |
|---|---|---|---|---|---|---|
| Cyclohexane g | | | 312 | | | |
| Benzene g | 35 | 44 | 52.8 | 61.6 | 70.4 | 79.2 |
| Butadiene-1,3 g | | | 84.3 | | | |
| Butadiene-1,2 g | | | 0.12 | | | |
| Cobalt octoate g | | | 0.0093 | | | |
| DEAC pphm | | | 0.6 | | | |
| Water millimoles | | | 1.27 | | | |
| Polymerization temperature 27° C.; polymerization time: 1 hour. | | | | | | |
| Conversion to polymer % | 51.6 | 61.2 | 55.3 | 77.6 | 61.0 | 84.6 |
| Mooney ML 1 + 4 at 100° C. | 36.5 | 40 | 37 | — | 35 | 26 |

EXAMPLE 3

Using a cyclohexane-benzene mixture (90/10 by weight) as solvent, butadiene-1,3 was polymerized in the presence of various quantities of 1,5-cyclooctadiene using as catalyst cobalt octoate, aluminum diethyl chloride (DEAC) and water. The polymerization was at 27°

C. and for 60 minutes. The recipe used and the polymerization results are shown in Table III.

TABLE III

| Experiment No. | 1 | 2 | 3 | 4 | 5 |
|---|---|---|---|---|---|
| Solvent g | | | 350 | | |
| Butadiene-1,3 g | | | 84.3 | | |
| 1,5-cyclooctadiene g | 0 | 0.17 | 0.25 | 0.42 | 0.58 |
| Cobalt octoate g | | | 0.0057 | | |
| DEAC millimoles | | | 2 | | |
| Water millimoles | | | 0.83 | | |
| Conversion to polymer % | 58.9 | 62.7 | 61.7 | 54.6 | 56.9 |
| Mooney (ML 1 + 4 at 100° C.) | 121.5* | 84.5* | 73 | 42.5 | 28.5 |

*converted from MS 1 + 4 at 100° C. measurement.

EXAMPLE 4

Butadiene-1,3 was polymerized in a cyclohexane-benzene mixture using as the polymerization catalyst cobalt octoate, aluminum diethyl monochloride and water and using 1,5-cyclooctadiene as the modifier. The recipe used and the results of the polymerization are shown in Table IV. The solvent contained, per 100 grams, 90 grams of cyclohexane and 10 grams of benzene, the polymerization temperature was 27° C. and the polymerization time was 60 minutes.

TABLE IV

| Experiment No. | 1 | 2 | 3 | 4 | 5 |
|---|---|---|---|---|---|
| Solvent g | | | 350 | | |
| Butadiene-1,3 g | | | 84.3 | | |
| 1,5 cyclooctadiene g | | | 0.42 | | |
| Cobalt octoate g | | | 0.0057 | | |
| Aluminum diethyl chloride pphm | 0.19 | 0.24 | 0.29 | 0.21 | 0.19 |
| Water millimoles | 0.83 | 0.83 | 0.83 | 0.61 | 0.56 |
| Conversion to polymer % | 65.2 | 54.9 | 70.0 | 65.2 | 38.3 |
| Mooney (ML 1 + 4 at 100° C.) | 55.5 | 54 | 50.5 | 45 | — |

EXAMPLE 5

A solvent mixture of butene-1, benzene and cyclohexane was used for the polymerization of butadiene-1,3, with 1,5-cyclooctadiene added as a polymerization modifier. The details are shown in Table V.

TABLE V

| Experiment No. | 1 | 2 | 3 | 4 |
|---|---|---|---|---|
| Benzene g | 40 | 40 | 40 | 40 |
| Cyclohexane g | 200 | 200 | 200 | 200 |
| Butene-1 g | 80 | 80 | 80 | 80 |
| 1,5-cyclooctadiene g | 0.4 | 0.4 | 0.4 | 0.4 |
| Butadiene-1,3 g | 80 | 80 | 80 | 80 |
| H$_2$O millimoles | 1 | 1 | 1 | 1 |
| Cobalt octoate ppm on Bd-1,3 | 62 | 62 | 62 | 62 |
| DEAC millimoles | 2.45 | 2.45 | 2.45 | 2.45 |
| Polymerize at 27° C. | | | | |
| Polymerization time minutes | 40 | 50 | 60 | 90 |
| Conversion to polymer % | 42.5 | 41 | 60 | 57 |
| Mooney (ML 1 + 4 at 100° C.) | — | — | 37.5 | 38 |
| DSV | — | — | 1.96 | 2.04 |

EXAMPLE 6

Using cyclohexane as the solvent, butadiene-1,3 was polymerized with 1,5-cyclooctadiene being used to modify the polymerization. The details are shown in Table VI. The polymers from experiment Nos. 3,4 and 5 were found by I.R. analysis to have cis-1,4 contents of 97.9, 97.7 and 98.2% respectively.

TABLE VI

| Experiment No. | 1 | 2 | 3 | 4 | 5 |
|---|---|---|---|---|---|
| Cyclohexane g | | | 344 | | |
| Butadiene-1,3 g | | | 83.6 | | |
| 1,5-cyclooctadiene g | 0.36 | 0.42 | 0.48 | 0.54 | 0.60 |
| H$_2$O millimoles | | | 1.4 | | |
| Cobalt octoate ppm on Bd.-1,3 | | | 68 | | |
| DEAC millimoles | | | 2.0 | | |
| Polymerize at 27° C. for 90 minutes | | | | | |
| Conversion to polymer % | 65 | 52 | 60.5 | 67 | 65 |
| Mooney (ML 1 + 4 at 100° C.) | 85 | 66 | 51.5 | 46 | 38 |
| DSV | — | — | 2.27 | 2.17 | 2.05 |

What is claimed is:

1. A process for the polymerization of butadiene-1,3 to produce a cis-1,4-polybutadiene having a cis-1,4 content of at least about 90% using a catalyst system comprising a cobalt salt of an organic carboxylic acid, an aluminum alkyl halide and water, characterized in that the polymerization is in the presence of (a) a diluent which comprises per 100 parts by weight, (i) from 100 to about 80 parts by weight of cyclohexane and from 0 to about 20 parts by weight of benzene or butene-1, or (ii) from about 92.5 to about 60 parts by weight of cyclohexane, from about 2.5 to about 15 parts by weight of benzene and from about 5 to about 25 parts by weight of butene-1, and (b) a modifier selected from about 0.05 to about 0.15 parts by weight of butadiene-1,2 per 100 parts by weight of butadiene-1,3 or from about 0.2 to about 1 parts by weight of 1,5-cyclooctadiene per 100 parts by weight of butadiene-1,3, the cobalt salt is one of cobalt (II) octanoate or cobalt (II) naphthenate and the aluminum alkyl halide is diethyl aluminum chloride, the molar ratio of the cobalt salt to the aluminum alkyl halide is from 1:5 to 1:500, the amount of cobalt salt is from about 0.01 to about 0.5 millimoles per 100 g of butadiene-1,3 and the amount of water is from about 0.2 to about 0.9 millimoles per millimole of aluminum alkyl halide.

2. The process of claim 1 characterized in that the diluent comprises, per 100 parts by weight, from about 92.5 to about 60 parts by weight of cyclohexane, from about 2.5 to about 15 parts by weight benzene and from about 5 to about 25 parts by weight of butene-1.

3. The process of claim 2 characterized in that the diluent comprises from about 80 to about 60 parts by weight of cyclohexane from about 5 to about 15 parts by weight of benzene and from about 15 to about 25 parts by weight of butene-1.

4. The process of claim 3 characterized in that the modifier is 1,5-cyclooctadiene in an amount of from about 0.3 to about 0.8 parts by weight per 100 parts by weight of butadiene-1,3.

* * * * *